United States Patent
Levy et al.

(10) Patent No.: US 10,936,461 B2
(45) Date of Patent: Mar. 2, 2021

(54) SYSTEM AND METHOD FOR SEQUENCE-BASED ANOMALY DETECTION AND SECURITY ENFORCEMENT FOR CONNECTED VEHICLES

(71) Applicant: Upstream Security, Ltd., Herzliya (IL)

(72) Inventors: Yoav Levy, Kfar-Vitkin (IL); Yonatan Appel, Ramat Hasharon (IL); Nati Vazana, Yavne (IL); Yossi Asher, Herzliya (IL)

(73) Assignee: Upstream Security, Ltd., Herzliya (IL)

( * ) Notice: Subject to any disclaimer, the term of this patent is extended or adjusted under 35 U.S.C. 154(b) by 359 days.

(21) Appl. No.: 16/230,044

(22) Filed: Dec. 21, 2018

(65) Prior Publication Data

US 2020/0201731 A1    Jun. 25, 2020

(51) Int. Cl.
| | | |
|---|---|---|
| *G06F 11/00* | (2006.01) | |
| *G06F 11/28* | (2006.01) | |
| *G06N 20/00* | (2019.01) | |
| *G06F 11/34* | (2006.01) | |
| *G05D 1/00* | (2006.01) | |
| *G07C 5/00* | (2006.01) | |

(52) U.S. Cl.
CPC ........... *G06F 11/28* (2013.01); *G05D 1/0027* (2013.01); *G05D 1/0088* (2013.01); *G06F 11/3447* (2013.01); *G06N 20/00* (2019.01); *G07C 5/008* (2013.01); *G06F 2201/81* (2013.01); *G06F 2201/86* (2013.01)

(58) Field of Classification Search
CPC .. G06F 11/28; G06F 11/3447; G06F 11/0739; G06F 11/3013; G06F 2201/81; G06F 2201/86; G06N 20/00; G05D 1/0027; G05D 1/0088; G07C 5/008
See application file for complete search history.

(56) References Cited

U.S. PATENT DOCUMENTS

| | | | | |
|---|---|---|---|---|
| 9,843,594 | B1 * | 12/2017 | Evans | H04L 63/1425 |
| 2011/0264318 | A1 * | 10/2011 | Laforge | G07C 5/085 |
| | | | | 701/22 |
| 2018/0255082 | A1 * | 9/2018 | Ostergaard | B60R 16/0231 |
| 2018/0351980 | A1 * | 12/2018 | Galula | H04W 12/12 |
| 2019/0258242 | A1 * | 8/2019 | Avery | G06K 9/00979 |

\* cited by examiner

*Primary Examiner* — Joseph D Manoskey
(74) *Attorney, Agent, or Firm* — M&B IP Analysts, LLC

(57) ABSTRACT

A system and method for connected vehicle sequence anomaly detection. The method includes creating a normal sequence profile for a group of connected vehicles based on a plurality of first messages by training a normal behavior model using unsupervised machine learning with respect to potential sequences, the normal sequence profile defining normal sequences and triggers, wherein each of the plurality of normal sequences is associated with a timeframe, wherein each sequence is a series of condition combinations; pre-processing a second data set by generating a plurality of second messages in a unified format; identifying at least one instance of the plurality of triggers in the plurality of second messages; and detecting at least one abnormal sequence based on the identified at least one instance and the normal sequence profile, wherein an abnormal sequence is detected when none of the plurality of normal sequences is identified in the second data set.

19 Claims, 3 Drawing Sheets

SYSTEM AND METHOD FOR SEQUENCE-BASED ANOMALY DETECTION AND SECURITY ENFORCEMENT FOR CONNECTED VEHICLES

TECHNICAL FIELD

The present disclosure relates generally to detecting anomalies among connected vehicles, and more specifically to detecting anomalies based on sequences of communications with connected vehicles.

BACKGROUND

With advances in computer technology, computerized navigation and control systems in vehicles have been created to improve drivers' experiences and to allow for remotely controlled transportation of people and goods. These computerized car systems can provide guided or assisted driving, or autonomously control vehicles. To this end, computerized driving systems may have access to and control over critical vehicle functions such as, for example, unlocking the car, turning the engine on and off, controlling steering and braking, and the like. To aid in navigation and control, connected vehicles may be equipped with network access that allows the connected vehicles to communicate with each other and/or with remote control systems. These connected vehicles may be used for, e.g., tracking commercial cars (for example, buses, trucks, delivery/rental vehicles), navigating self-driving or assisted driving cars, car sharing services, and the like. Gartner, Inc., forecasts that, by 2020, there will be at least 220 million connected cars on the road.

Connected vehicles, like other vehicles, may be organized in fleets of two or more vehicles. Connected vehicles in fleets may communicate directly or indirectly with each other, with a centralized system configured to manage the fleet, with user devices, and so on. The organization of connected vehicles into fleets allows for coordinating control of the connected vehicles based on a common control scheme.

While connected vehicles offer great opportunities for providing improved services to owners of vehicles, the communications used by connected vehicles leave those connected vehicles potentially vulnerable to cyber-attacks. This problem is compounded among fleets of connected vehicles, where infiltrating any of the connected vehicles may, in turn, provide hackers or other malicious entities with improper access to the entire fleet. Such cyber-attacks can cause significant harm in the form of delayed arrivals of the connected vehicles or, in more extreme cases, vehicular accidents that can result in harm to people and/or financial loss.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for connected vehicle sequence anomaly detection, comprising: creating a normal sequence profile for a group of connected vehicles based on a first data set including a plurality of first messages, the group including at least one connected vehicle, each message indicating communications data related to the group of connected vehicles, wherein the normal sequence profile is created by training a normal behavior model using unsupervised machine learning with respect to a plurality of potential sequences, the normal sequence profile defining a plurality of normal sequences and a plurality of triggers, wherein each of the plurality of normal sequences is associated with a timeframe, wherein each sequence is a series including a plurality of condition combinations; preprocessing a second data set, wherein preprocessing the second data set further comprises generating a plurality of second messages in a unified format; identifying at least one instance of one of the plurality of triggers in the plurality of second messages; and detecting at least one abnormal sequence based on the identified at least one instance and the normal sequence profile, wherein each of the at least one abnormal sequence is detected when none of the plurality of normal sequences is identified in the second data set with respect to the at least one instance and each associated timeframe.

Certain embodiments disclosed herein also include a non-transitory computer readable medium having stored thereon causing a processing circuitry to execute a process, the process comprising: creating a normal sequence profile for a group of connected vehicles based on a first data set including a plurality of first messages, the group including at least one connected vehicle, each message indicating communications data related to the group of connected vehicles, wherein the normal sequence profile is created by training a normal behavior model using unsupervised machine learning with respect to a plurality of potential sequences, the normal sequence profile defining a plurality of normal sequences and a plurality of triggers, wherein each of the plurality of normal sequences is associated with a timeframe, wherein each sequence is a series including a plurality of condition combinations; preprocessing a second data set, wherein preprocessing the second data set further comprises generating a plurality of second messages in a unified format; identifying at least one instance of one of the plurality of triggers in the plurality of second messages; and detecting at least one abnormal sequence based on the identified at least one instance and the normal sequence profile, wherein each of the at least one abnormal sequence is detected when none of the plurality of normal sequences is identified in the second data set with respect to the at least one instance and each associated timeframe.

Certain embodiments disclosed herein also include a system for connected vehicle sequence anomaly detection. The system comprises: a processing circuitry; and a memory, the memory containing instructions that, when executed by the processing circuitry, configure the system to: create a normal sequence profile for a group of connected vehicles based on a first data set including a plurality of first messages, the group including at least one connected vehicle, each message indicating communications data related to the group of connected vehicles, wherein the normal sequence profile is created by training a normal behavior model using unsupervised machine learning with respect to a plurality of potential sequences, the normal sequence profile defining a plurality of normal sequences and a plurality of triggers, wherein each of the plurality of normal sequences is associated with a timeframe, wherein each sequence is a series including a plurality of condition combinations; preprocess a second data set, wherein preprocessing the second data set further comprises generating a plurality of second messages in a unified format; identify at least one instance of one of the plurality of triggers in the plurality of second messages; and detect at least one abnormal sequence based on the identified at least one instance and the normal sequence profile, wherein each of the at least one abnormal sequence is detected when none of the plurality of normal sequences is identified in the second data set with respect to the at least one instance and each associated timeframe.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
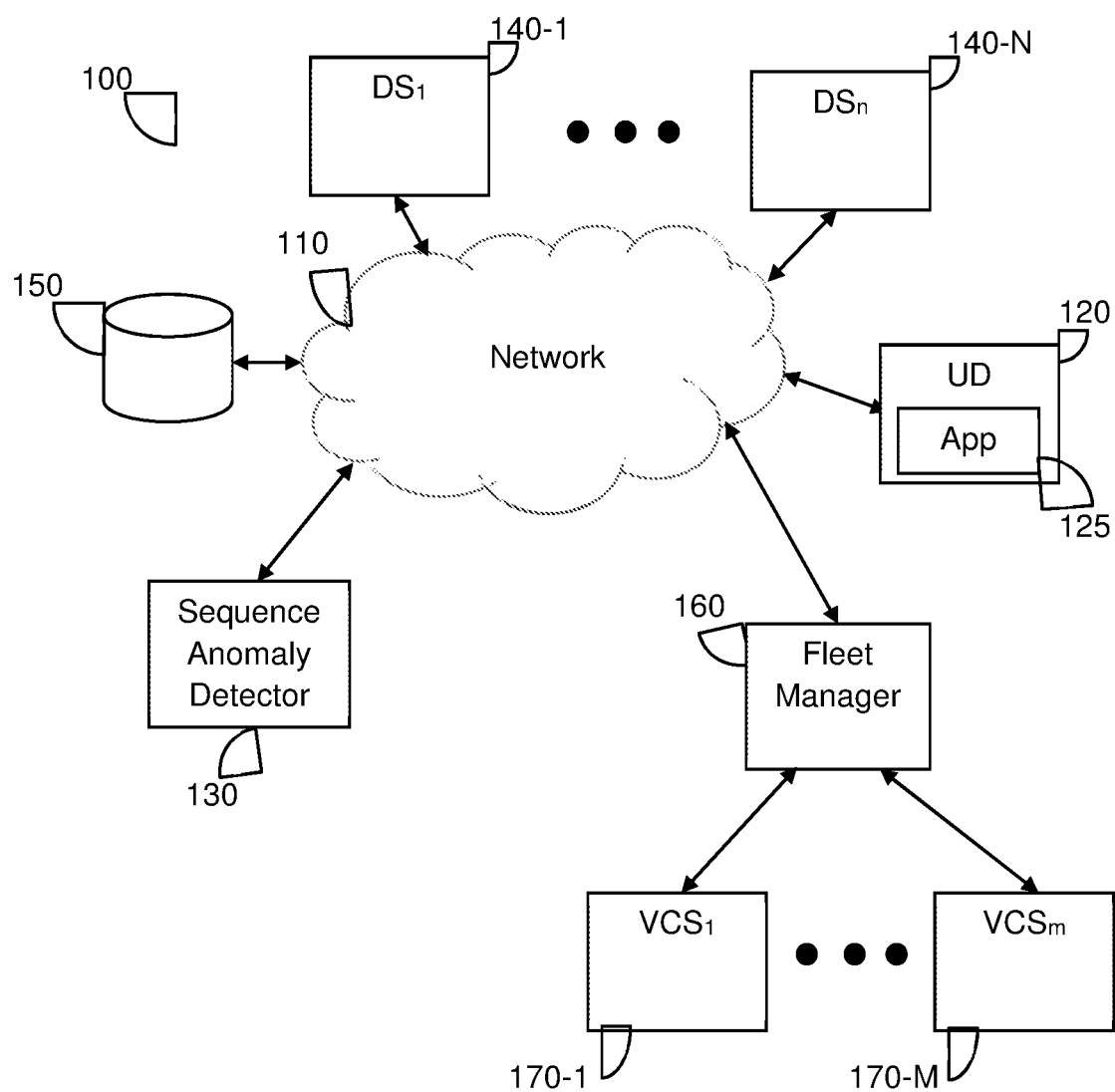
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for sequence-based anomaly detection and security enforcement for connected vehicles. The disclosed embodiments include learning potential and normal sequences based on communications with connected vehicles and detecting anomalies based on deviations from the normal sequences. To this end, the anomalies may be detected by identifying triggers in application data, where each trigger is associated with one or more of the potential sequences. If a normal sequence is not identified with respect to one of the triggers, an anomaly is detected. Each sequence includes a series of conditions or combinations of conditions, a trigger, and a timeframe. The conditions are requirements for parameters of events, commands, or both, indicated in messages.

Each event indicates an occurrence or status with respect to a connected vehicle. For example, an event may indicate that the connected vehicle's engine has been started, or that the connected vehicle's engine speed is a particular value (e.g., 500 RPM) at a point in time.

Each sequence is defined with respect to at least one time period as compared to a trigger including, but not limited to, a window of time leading up to the trigger, a time delay after the trigger, or both. In various embodiments, the events are normalized into messages in a unified format to allow for comparison between like communications data received from different sources of communications data. The normalized messages may further be abstracted to remove data that is not relevant to sequence analysis.

The disclosed embodiments allow for identifying abnormal behavior in the form of unusual sequences of condition combinations that may not individually demonstrate abnormal behavior. To this end, it has been identified that certain sequences of events and commands related to connected vehicles may be reliably predicted based on the identification of triggers in communications data. As a result, deviations from these predicted sequences indicate abnormalities that may be utilized to detect potential cybersecurity threats to connected vehicles. For example, a vehicle starting its engine remotely may not be abnormal when viewed in isolation, but a vehicle starting its engine remotely without first receiving a command to start the engine may be abnormal. These threats may cause magnified harm when a fleet of connected vehicles is affected simultaneously.

FIG. 1 is an example network diagram 100 utilized to describe the various disclosed embodiments. The network diagram 100 includes a user device (UD) 120, a sequence anomaly detector 130, data sources (DSs) 140-1 through 140-N (hereinafter referred to individually as a data source 140 and collectively as data sources 140, merely for simplicity purposes), a database 150, a fleet manager 160, and vehicle control systems (VCSs) 170-1 through 170-M (hereinafter referred to individually as a vehicle control system 170 and collectively as vehicle control systems 170, merely for simplicity purposes) communicating via a network 110. The network 110 may be, but is not limited to, the Internet, the world-wide-web (WWW), a wide area network (WAN), a metro area network (MAN), and other networks capable of enabling communication between the elements of the network diagram 100.

The user device 120 may be, but is not limited to, a personal computer (PC), a personal digital assistant (PDA), a mobile phone, a smart phone, a tablet computer, a wearable computing device and other kinds of wired and mobile appliances, equipped with communication capabilities that are enabled as further discussed herein below. The user device 120 may have installed thereon an application (App) 125. The application 125 may be configured to receive inputs from a user indicating commands to be executed by the fleet manager 160 or by one or more of the vehicle control systems 170, and to send the commands to the fleet manager 160.

Sequence anomalies may be detected based on communications among communications data sources including the VCSs 170, the fleet manager 160, and the user device 120. To this end, the communications among these communications data sources may be analyzed to determine sequences of conditions. Normal sequences of conditions may be learned based on these communications, and subsequent sequences may be analyzed with respect to the learned normal sequences to detect potential cyber-threats to the fleet.

In an embodiment, the sequence anomaly detector 130 is deployed in a datacenter (not shown). Accordingly, the connected vehicles controlled by the vehicle control systems 170 may be secured from the datacenter. Alternatively, the sequence anomaly detector 130 may be deployed in a cloud computing platform (not shown) such as a public cloud, a private cloud, or a hybrid cloud.

Each of the vehicle control systems 170 is deployed with respect to a connected vehicle (not shown) and is configured to collect data (e.g., data related to events) from the respective connected vehicle. Each of the vehicle control systems 170 may further be configured to control at least partially automated vehicle actions. A connected vehicle is configured to receive and send data (e.g., over the network 110), and may be further configured to implement commands in the received data (for example, a "Start_Engine" command). To this end, a connected vehicle includes computer components such as, but not limited to, a processing circuitry, a memory, a network interface, and the like. A connected vehicle may be, but is not limited to, a car, a bus, a truck, and the like. The connected vehicles may be at least partially controlled remotely.

The fleet manager 160 is configured to manage processes and tasks related to a fleet of connected vehicles (not shown) and may further be configured to at least partially control driving of the connected vehicles via the respective vehicle control systems 170. To this end, the fleet manager 160 may be an application server or a control server. The application server may include logic of an application program for managing individual controlled vehicles or fleets of controlled vehicles such as, but not limited to, the Local Motion fleet management app by Zipcar®, the UberFLEET app by Uber, and the like. The fleet manager 160 may be communicatively connected to the vehicle control systems 170 via one or more networks (not shown) such as the Internet, a local area network (LAN), and the like.

Figure 3:
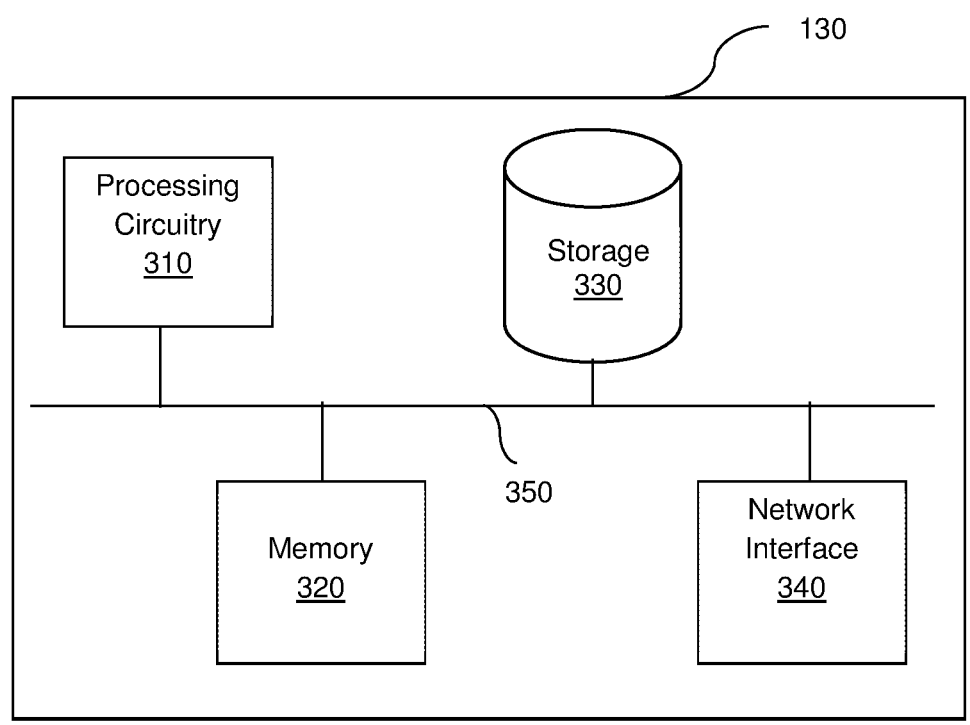
FIG. 3 is a schematic diagram of a sequence anomaly detector according to an embodiment.

In an embodiment, the sequence anomaly detector 130 includes a processing circuitry coupled to a memory (e.g., the processing circuitry 310 and the memory 320 as shown in FIG. 3). The memory contains instructions that can be executed by the processing circuitry. The instructions, when executed by the processing circuitry, configure the sequence anomaly detector 130 to secure fleets of connected vehicles against cyber-attacks by detecting sequence anomalies and causing mitigation actions as described herein.

In an embodiment, the sequence anomaly detector 130 is configured to collect communications data from the data sources 140. To this end, the data sources 140 store communications data for communications related to connected vehicles such as, but not limited to, events, vehicle states, data traffic, telemetry data (e.g., Controller Area Network messages, sensor readings collected by sensors of a car, etc.), over-the-air (OTA) updates, log analytics, Lidar data, radar data, images, videos, and the like. The data stored in the data sources 140 may be from fleet managers (e.g., the fleet manager 160), user devices (e.g., the user device 120), vehicle control systems (e.g., the VCSs 170), traffic control systems (not shown), and other systems configured to monitor and collect data related to vehicle or fleet behavior. Specifically, data from multiple different sources of information may be collected and utilized to detect sequence anomalies.

In an embodiment, the sequence anomaly detector 130 is configured to normalize the data into messages in a unified format including at least one vehicle data abstraction. In particular, events and commands may include related information in different formats. For example, information related to engine speed may be formatted differently. To this end, normalizing the data into unified format messages allows for comparison of comparable data.

Each vehicle data abstraction is a representation of a portion of the vehicle data including only data utilized for anomaly detection. As non-limiting examples, abstractions for vehicle data may include, but are not limited to, time, message source, message target, client identifier (ID), driver ID, application, server ID, request type, server response status, violation type, violation name, OTA update ID, OTA update name, OTA update distribution time, client distribution time, vehicle location, speed, gear position, odometer value, acceleration, engine speed, engine state, wheel position, telematics, server commands, vehicle message identifier, and the like. Abstracting the vehicle data allows for more efficient processing and anomaly detection by ensuring that only data relevant to sequence analysis is analyzed during anomaly detection.

The message source and message target indicate the entity sending and receiving a communication, respectively. Each of the message source and message target may be, but is not limited to, a connected vehicle, a server, a mobile device, a smart city, and the like. Examples a message source and corresponding message target may include, but are not limited to, a server sending a command to a connected vehicle, a first connected vehicle sending event data to a second connected vehicle, and the like.

In an embodiment, the sequence anomaly detector 130 is further configured to aggregate the communications data and to organize the communications data with respect to time. The organization may include, for example, grouping communications data based on arbitrary sliding timeframes which may or may not overlap. The communications data may further be grouped with respect to particular connected vehicles, fleets of connected vehicles, sub-fleets of connected vehicles, and the like.

Based on a training data set including the messages, the sequence anomaly detector 130 is configured to learn potential sequences and to create models of normal sequence behavior. Each model is created via unsupervised machine learning using the messages as inputs and may be created with respect to a group of one or more connected vehicles. The group may further be a fleet, a sub-fleet, and the like. Each sub-fleet is a grouping of vehicles among a fleet, and may include, e.g., all vehicles matching a common condition. For example, a sub-fleet may include vehicles at or near a geographical location (e.g., within 100 miles of the geographical location), vehicles connected to the same local area network, vehicles of a specific make or model, vehicles of a specific year, vehicles adhering to a predefined condition, a combination thereof, and the like.

The groups of connected vehicles may be permanent groupings that are predetermined, or may be created ad-hoc, for example as vehicles move from one location to another. Ad-hoc creation of groupings allows for dynamic grouping of vehicles that are more likely to exhibit similar behavior or deviations from behavior, thereby allowing for more accurate anomaly detection. Further, the models do not need to be mutually exclusive. For example, a model for multiple groups that are overlapping may be created.

In an embodiment, models may be created with respect to different levels of a hierarchy of vehicles within a fleet (e.g., the entire fleet, one or more sub-fleets, further subdivisions of the fleet, one or more individual vehicles, etc.). Modeling vehicle behavior at different hierarchical levels allows for more accurate anomaly detection and classification, and may further allow for root cause determination for anomalies with respect to particular vehicles or groupings of vehicles among a fleet.

Solely for the sake of simplicity of discussion, the disclosed embodiments are described as follows with respect to learning sequences for individual connected vehicles. However, sequences may be learned for groupings of connected vehicles by grouping the communications data accordingly.

The learning includes analyzing the messages to identify distinct values and fields as well as mapping the identified values to the identified fields. The mapped values and fields are utilized to learn conditions related to events and commands indicated in the messages. Then, condition combinations may be learned based on conditions having high correlations among messages (e.g., conditions that frequently appear in the same message). Sequences are learned based on the condition combinations and their respective time groupings (i.e., based on condition combinations appearing in the same timeframe as each other). Once potential sequences have been learned, training data including the messages may be used as inputs to an unsupervised machine learning algorithm to train a normal behavior model for a group of connected vehicles with respect to the potential sequences. The normal behavior model defines normal sequences occurring in communications data for the group of connected vehicles and is utilized to create a normal sequence profile for the group of connected vehicles indicating these normal sequences.

Each sequence includes two or more conditions or combinations of conditions (or a combination thereof, e.g., one condition and two condition combinations), a trigger, and a timeframe. Any or all sequences may further include an indicator of a required order such that some or all of the sequences may require events to occur in a particular order in addition to occurring within a particular timeframe.

Each sequence may be further associated with one or more channels. The channels are indicators of relationships among sources of communications data such as, for example, a relationship between a server acting as a fleet manager and one of the connected vehicles in a fleet managed by the server. Each channel includes one or more message sources and one or more message targets. To this end, sequences may be defined with respect to channels that are single channels (e.g., conditions related to a communication between a single message source and a single message target) or multi-channels (e.g., conditions related to multiple communications, for example between a first message source and a first message target and between a second message source and a second message target). The message sources and targets in a multi-channel may overlap, for example, the message target of one communication may be the message source for another communication. Sequences may be organized with respect to these channels to allow for comparing only sequences related to the same channel.

A trigger is a parameter that defines circumstances for checking messages to determine whether a learned normal sequence can be identified. The trigger may be time-based or based on one or more conditions. Example triggers may include, but are not limited to, passage of a particular amount of time, a condition, or a condition combination. As non-limiting examples, a time-based trigger may occur after every 10 seconds passes and a condition-based trigger may occur whenever the engine of a connected vehicle is turned on. More specifically, a condition-based trigger may be based on one or more conditions such as, for example, "message type='event'" and name='engine start.'" As a non-limiting example, for a sequence "type='event' AND name='engine start'=>type='event' AND engine RPM>500," the trigger may be a message with type "event" and name "engine start." Alternatively, the trigger for such a sequence may be a message having a source that is a connected vehicle (i.e., such that the message is an event sent by the connected vehicle).

The timeframe for a sequence may be, but is not limited to, a window of time, a delay time, and the like. The window of time defines an amount of time used for checking for potential sequences prior to occurrence of a trigger and may be used when, for example, the trigger occurs as the last condition combination in an order of the sequence. The delay time defines an amount of time used for checking for potential sequences after occurrence of a trigger when the trigger is not the last condition combination in an order of the sequence.

As noted above, the sequence anomaly detector 130 is configured to conduct a potential sequence learning phrase including learning conditions, condition combinations, sequences, and sequence times. The conditions are individual conditions such as, but not limited to:
message type='event';
message name='driving start'; and
engine speed>500

The condition combinations each include two or more conditions having high correlations within the same message (i.e., such that each condition combination includes two or more conditions that appear in the same messages above a threshold). A condition combination may be expressed, for example, as a set of conditions and a logical operator such as "AND." Example condition combinations may include, but are not limited to:
message type='event' AND message name='driving start' AND velocity>0;
message name='engine start" AND engine speed>500; and
message type='event' AND driver door is opened.

Each sequence is a series of condition combinations that occur within the same timeframe. To this end, each sequence includes two or more conditions, condition combinations, or both (hereinafter discussed with respect to two or more condition combinations merely for simplicity purposes). An example non-limiting potential sequence includes the following two condition combinations:
1) message source='server' AND message type='command' AND message name='remote start engine'
2) message source='vehicle' AND message type='event' AND message name='engine remotely started'

In the above sequence example, the potential sequence is based on messages indicating (1) a command from a server to remotely start an engine and (2) an event from a connected vehicle indicating that its engine was remotely started. In such an example, if the potential sequence is a learned normal sequence for a vehicle, any deviation from this sequence (as a non-limiting example, the vehicle remotely starting without a command from the server) indicates anomalous behavior that may represent a potential threat. The above order of the sequence may be, but is not necessarily, required (e.g., depending on whether the sequence including a required order indicator).

The normal sequence profile includes normal sequences for a group of connected vehicles and triggers associated with the normal sequences. Using the normal sequence profile and an application data set including communications data related to the group of connected vehicles, the sequence anomaly detector 130 is configured to detect, in real-time, sequence anomalies. Specifically, the sequence anomalies are detected based on deviations from the normal sequences defined in the normal sequence profile for the group of connected vehicles. To this end, the sequence anomaly detector 130 is configured to identify instances of triggers associated with the normal sequences, to identify sequences with respect to the identified trigger instances, and to determine whether one of the normal sequences has occurred for each identified trigger instance. If an associated normal sequence has not been identified for one of the trigger instances, a sequence anomaly is detected.

Returning to the above example, the second condition combination (i.e., the condition combination including an event indicating that an engine was remotely started) may be a trigger associated with a normal sequence for a group of connected vehicles such that, when the trigger is identified in application data, a portion of the application data associated with times that are within a window of time (e.g., 1 minute) prior to the engine being remotely started may be analyzed to determine whether the other condition combination in the sequence (i.e., the first condition combination including a command to remotely start the engine) has been met and, if not, an abnormal sequence is detected.

When a sequence anomaly is detected, the sequence anomaly detector 130 may be configured to cause, in real-time, implementation of at least one mitigation action for mitigating the cyber threat. The sequence anomaly detector 130 may be configured to send instructions for implementing the mitigation actions to the fleet manager 160, to any of the vehicle control systems 170, to a server used for providing connected vehicle services (e.g., a server of a traffic control service), among the data sources 140, and the like.

It should be noted that only one fleet manager 160 and one set of vehicle control systems 170 are described herein with respect to FIG. 1 merely for simplicity purposes and without limitation on the disclosed embodiments. Multiple fleet managers, groups of vehicle control systems, individual vehicle control systems, or combinations thereof, may be secured in accordance with the disclosed embodiments. Each fleet may be protected based on a learned fleet behavioral model for that fleet.

It should be further noted that only one user device 120 and one application 125 are described herein above with reference to FIG. 1 merely for the sake of simplicity and without limitation on the disclosed embodiments. Multiple user devices may provide requests for commands to be executed by the vehicles control systems 170 without departing from the scope of the disclosure. Further, requests may be received from servers or other systems without departing from the scope of the disclosure.

It should also be noted that various embodiments are described with respect to a fleet manager 160 merely for example purposes and without limitation on the disclosed embodiments. Fleet behavioral data may be received from the vehicle control systems 170 directly (i.e., instead of through a fleet manager). Further, at least some functions (e.g., determining and sending commands to the vehicle control systems 170) that would be performed by a fleet manager may instead be performed by the sequence anomaly detector 130 without departing from the scope of the disclosure. An example network diagram illustrating an implementation without a fleet manager is described further in U.S. patent application Ser. No. 16/047,444, assigned to the common assignee, the contents of which are hereby incorporated by reference.

It should also be noted that the embodiments described herein with respect to FIG. 1 are discussed with respect to a fleet of connected vehicles, but that connected vehicles may be individually protected as groups of one vehicle without being included in a fleet or sub-fleet according to the disclosed embodiments. The groups may be modified after creation of normal behavior profiles for the groups. The disclosed embodiments are not limited to implementations in which the groups of connected vehicles are fleets, sub-fleets, and the like.

Figure 2:
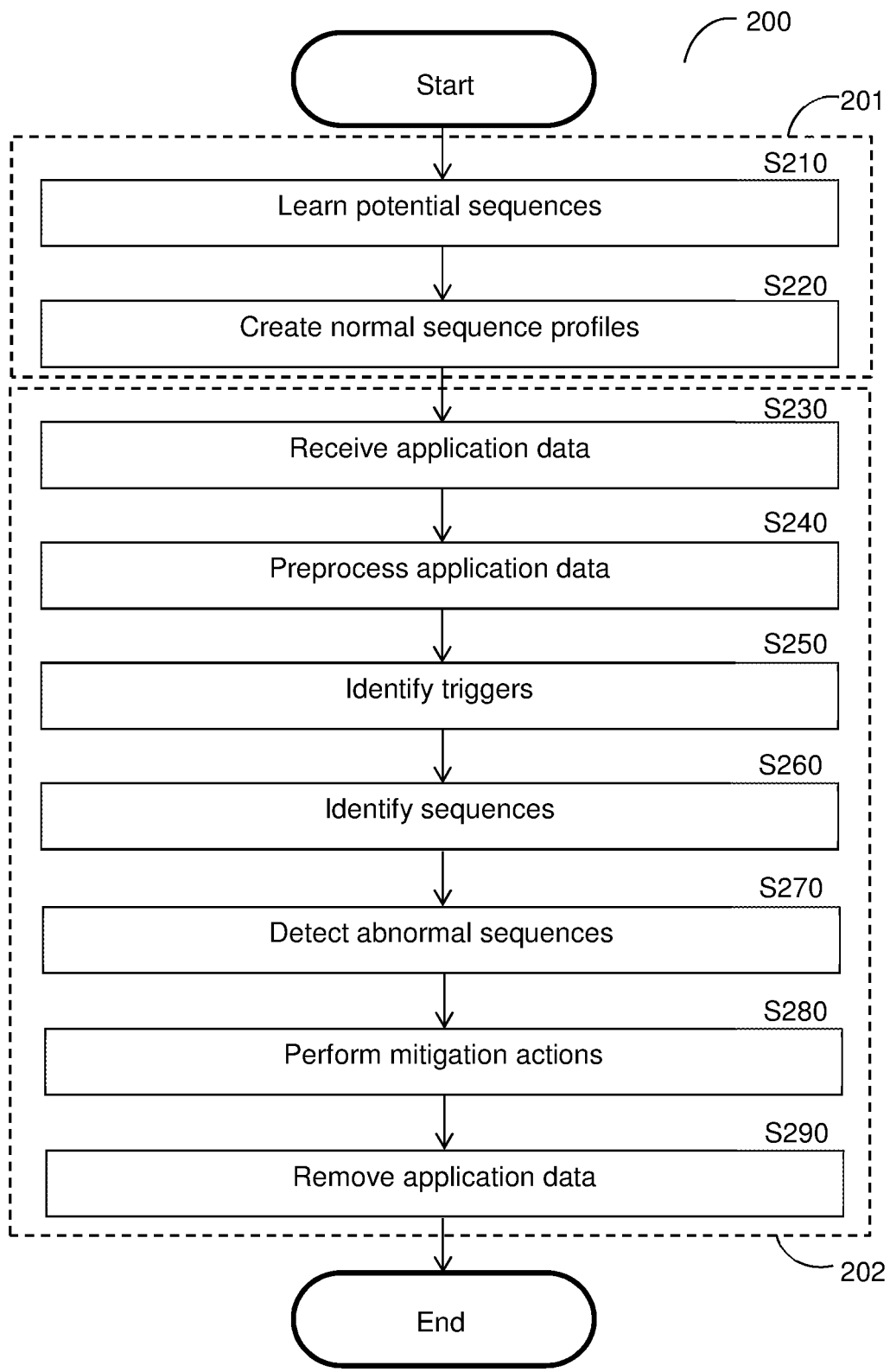
FIG. 2 is a flowchart illustrating a method for sequence analysis and security enforcement for connected vehicles according to an embodiment.

FIG. 2 is an example flowchart 200 illustrating a method for sequence analysis and security enforcement for a group of connected vehicles according to an embodiment. In an embodiment, the method is performed by the sequence anomaly detector 130, FIG. 1. The group of connected vehicles may further be a fleet or sub-fleet of connected vehicles communicating with each other, with one or more of the same servers or user devices, both, and the like.

In the example flowchart 200, the steps occur during a learning phase 201 and an application phase 202. During the learning phase 201, potential and normal sequences are learned based on training data. To this end, any of the steps in the learning phase may further include preprocessing the training data by, for example, normalizing the data into abstracted messages as described herein. Each abstracted message is in a unified format and includes only data that is relevant to sequence analysis (e.g., parameters that are relevant to conditions, times, relationships among sources of communications data, and the like). In various implementations, the learning phase 201 may be performed offline using a training data set stored in a database, and may be performed at a remote time from the application phase 202.

At S210, potential sequences for connected vehicles are learned. The potential sequences are learned based on communications that previously occurred with connected vehicles, and each sequence includes a series of conditions as described herein above. Specifically, each sequence is a set of complex conditions among two or more messages within a timeframe. To this end, each sequence includes two or more conditions or combinations of conditions, a trigger, and a timeframe. Any or all sequences may further include an indicator of a required order. Each message indicates information related to communications between connected vehicles.

In an embodiment, the potential sequences may be learned in stages, specifically, by learning individual conditions, condition combinations that frequently appear in the same message, and sequences of condition combinations in different stages. The sequences include groupings of condition combinations grouped at least with respect to timeframes that have a higher correlation than other groupings of condition combinations, for example, such that they appear together in sliding timeframes (i.e., timeframes that vary in length) more frequently than the other groupings of conditions and condition combinations (e.g., above a threshold). The condition combinations of each sequence may be further grouped with respect to channels between sources of communications data.

In an embodiment, S210 includes identifying a trigger for each potential sequence. Each trigger defines circumstances prompting checking for sequences. In an example implementation, either the first or last condition combination in a potential sequence may be identified as the trigger. In other implementations, the trigger may be an intermediate condition combination.

The potential sequences may be grouped with respect to channels among sources of communications data such that each grouping of sequences relate to the same channel. A channel is between a message source sending a communication and a message target receiving the communication, and may be a single channel or a multi-channel. Example single channels may be, but are not limited to, between a user device and a connected vehicle or between a server and a connected vehicle. An example multi-channel is between a user device (as a first message source) and a server (as a first message target) and between the server (as a second message source) and a connected vehicle (as a second message target). As a non-limiting example, an example multi-channel sequence may include messages indicating sending a request for an action to be performed by the connected vehicle from a user device to a server and sending a command to perform the requested action from the server to the connected vehicle, respectively.

At S220, a normal sequence profile is created for a group of one or more connected vehicles (e.g., a fleet or sub-fleet). The normal sequence profile includes normal sequences for the group of connected vehicles as well as the triggers associated with the respective normal sequences. The normal sequence profile further indicates the timeframe used for checking for the normal sequence with respect to a time at which the trigger occurred. In an embodiment, the normal sequence profile is created using unsupervised machine learning based on a training data set including messages related to the group of connected vehicles. The training data set used for training the normal sequence profile may be the same training data set used for learning potential sequences or may be different. As a non-limiting example, the training data sets may be the same when learning only potential sequences for a specific group of connected vehicles or may be different to learn potential sequences for multiple entities and the normal sequences only for a specific entity.

The unsupervised machine learning involves training a normal behavior model based on the training data set with respect to the known potential sequences. In an embodiment, the normal behavior model is iteratively refined until at most a threshold proportion of abnormal sequences is determined using the normal sequence profile. To this end, S220 may include tuning the parameters for the normal behavior model and re-applying the normal behavior model to at least a portion of the training data set. In a non-limiting implementation, the threshold may be defined in violations per million (VPM) such that the normal sequence profile is refined until the number of abnormal sequences identified per million sequences analyzed is less than the allowable number of VPM. Refining the normal behavior model to limit the proportion of violations reduces false positive results by ensuring that the model is not overly sensitive with respect to potential abnormalities.

The group of connected vehicles may change after creation of the normal sequence profile. For example, one or more connected vehicles may be added to or removed from the group and the normal behavior profile may be used for the modified group. To this end, the group of connected vehicles may be identified using a group identifier that is independent of the particular vehicles in the group.

At S230, application data to be analyzed with respect to sequences is received. The application data includes data indicating direct communications with connected vehicles, indirect communications with connected vehicles (i.e., communications which are sent to one or more intermediary sources of communications data), or both.

At S240, the application data is preprocessed. In an embodiment, S240 includes normalizing the application data into abstracted messages. Each abstracted message is a message in a unified format including only data that is relevant to sequence analysis. As a result, normalizing the data into abstracted messages allows for comparison among alike types of data that is received in different formats as well as more efficient processing by removing irrelevant data.

At S250, one or more triggers are identified in the application data. The identified triggers are known triggers associated with the normal sequences indicated in the normal sequence profile. To this end, S250 includes searching through the application data for each trigger indicated in the normal sequence profile.

At S260, sequences are identified in the application data with respect to each of the identified triggers. In an embodiment, the sequences are identified by checking within the timeframe associated with the normal sequence associated with the respective trigger in the normal sequence profile. Specifically, a window of time before the time at which the trigger occurred or a delay time after the time at which the trigger occurred may be checked. In an embodiment, the sequences may be further identified with respect to sources of communications data (e.g., user devices and servers) communicating with each other, with connected vehicles of the group of connected vehicles, or both.

At S270, one or more abnormal sequences in the application data is detected based on the identified sequences, the identified triggers, and the normal sequence profile. An abnormal sequence is detected when, for example, an identified sequence does not match any normal sequence indicated in the normal behavior profile, no known normal sequence is identified with respect to one or more of the identified triggers, or both. An identified sequence may fail to match a normal sequence when, for example, one or more of the conditions of the normal sequence does not match corresponding conditions of the identified sequence, when the order of the normal sequence matters but the identified sequence does not have condition combinations occurring in the same order, both, and the like.

A condition in a normal sequence may match a condition in an identified sequence when the identified sequence condition meets the normal sequence condition. An example for non-matching conditions when a normal sequence includes a condition combination in which one of the conditions is "RPM>500" would be for a condition in the identified sequence being "RPM=400." In such an example, a matching condition of an identified sequence would be a condition in which a value for RPM is greater than 500.

At S280, when abnormal sequences have been detected, one or more mitigation actions are performed. The mitigation actions may include, but are not limited to, generating alerts, generating notifications, terminating communications with any connected vehicles, limiting communications with any connected vehicles, blocking communications from a server or user device, and the like.

At optional S290, data of the application data set that is no longer required may be removed from a data source (e.g., a database). The data that is no longer required may be, for example, data associated with times that are within the time periods associated with the identified triggers. This allows for only storing data until sequence analysis is performed on that data and, consequently, allows for conserving memory as well as processing power that would be needed to repeatedly check for triggers and analyze sequences.

It should also be noted that steps S210 and S220 are not discussed with respect to preprocessing of data used for the respective learning phases merely for simplicity purposes, but that training data may be preprocessed (e.g., by normalizing the data into abstracted messages as described at S240) without departing from the scope of the disclosed embodiments.

FIG. 3 is an example schematic diagram of a sequence anomaly detector 130 according to an embodiment. The sequence anomaly detector 130 includes a processing circuitry 310 coupled to a memory 320, a storage 330, and a network interface 340. In an embodiment, the components of the sequence anomaly detector 130 may be communicatively connected via a bus 350.

The processing circuitry 310 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 320 may be volatile (e.g., RAM, etc.), non-volatile (e.g., ROM, flash memory, etc.), or a combination thereof. In one configuration, computer readable instructions to implement one or more embodiments disclosed herein may be stored in the storage 330.

In another embodiment, the memory 320 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 310, cause the processing circuitry 310 to perform the various processes described herein. Specifically, the instructions, when executed, cause the processing circuitry 310 to generate fleet behavior models and detect anomalous behavior in fleets or sub-fleets as described herein.

The storage 330 may be magnetic storage, optical storage, and the like, and may be realized, for example, as flash memory or other memory technology, CD-ROM, Digital Versatile Disks (DVDs), or any other medium which can be used to store the desired information.

The network interface 340 allows the sequence anomaly detector 130 to communicate with the security agent 140 for the purpose of, for example, receiving communications data, causing mitigation actions to be performed, and the like.

It should be understood that the embodiments described herein are not limited to the specific architecture illustrated in FIG. 3, and other architectures may be equally used without departing from the scope of the disclosed embodiments.

It should be noted that various embodiments disclosed herein are discussed with respect to sequences which are series of condition combinations merely for simplicity purposes and without limitation on the disclosed embodiments. As noted above, sequences may include individual conditions as well as combinations of conditions.

It should also be noted that various embodiments are discussed with respect to developing normal behavior profiles for groups of connected vehicles such as fleets and sub-fleets, but that such groups may include a single vehicle without departing from the scope of the disclosed embodiments. Developing behavioral profiles of groups of connected vehicles allows for applying such profiles to changing groups, for example, as new vehicles are added to a fleet or sub-fleet. However, such profiles may be equally created for groups including single vehicles to allow for applying the single vehicle's normal behavior profile to other vehicles that may be grouped with it.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for connected vehicle sequence anomaly detection, comprising:

creating a normal sequence profile for a group of connected vehicles based on a first data set including a plurality of first messages, the group including at least one connected vehicle, each message indicating communications data related to the group of connected vehicles, wherein the normal sequence profile is created by training a normal behavior model using unsupervised machine learning with respect to a plurality of potential sequences, the normal sequence profile defining a plurality of normal sequences and a plurality of triggers, wherein each of the plurality of normal sequences is associated with a timeframe, wherein each sequence is a series including a plurality of condition combinations;

preprocessing a second data set, wherein preprocessing the second data set further comprises generating a plurality of second messages in a unified format;

identifying at least one instance of one of the plurality of triggers in the plurality of second messages; and detecting at least one abnormal sequence based on the identified at least one instance and the normal sequence profile, wherein each of the at least one abnormal sequence is detected when none of the plurality of normal sequences is identified in the second data set with respect to the at least one instance and each associated timeframe; and removing the plurality of second messages from a database.

2. The method of claim 1, wherein each of the plurality of second messages is an abstracted message including only data that is relevant to sequence analysis.

3. The method of claim 1, wherein each condition combination includes at least two conditions having a correlation in the plurality of first messages above a threshold.

4. The method of claim 1, wherein creating the normal sequence profile further comprises:

iteratively refining the normal behavior model until at most a threshold proportion of abnormal sequences is identified when applying the normal behavior model to the plurality of first messages.

5. The method of claim 1, wherein each timeframe is any of: a window of time prior to occurrence of a respective trigger, and a delay time after occurrence of a respective trigger.

6. The method of claim 1, wherein each sequence is associated with at least one channel among at least two sources of connected vehicle communications data, further comprising:

identifying a plurality of sequences in the second data set, wherein detecting the at least one abnormal sequence further comprises comparing each sequence identified in the second data set with at least one normal sequence of the plurality of normal sequences associated with the same channel.

7. The method of claim 1, wherein each trigger is any of: a time-based trigger, and a condition-based trigger.

8. The method of claim 1, wherein each of the plurality of normal sequences is further associated with a required order for the sequence, further comprising:

identifying a plurality of sequences in the second data set, wherein an abnormal sequence is detected when an order of one of the plurality of sequences identified in the second data set does not match the required order of any of the plurality of normal sequences.

9. The method of claim 1, wherein the plurality of second messages is removed from the database when the at least one abnormal sequence has been detected.

10. A non-transitory computer readable medium having stored thereon instructions for causing a processing circuitry to execute a process, the process comprising:

creating a normal sequence profile for a group of connected vehicles based on a first data set including a plurality of first messages, the group including at least one connected vehicle, each message indicating communications data related to the group of connected vehicles, wherein the normal sequence profile is created by training a normal behavior model using unsupervised machine learning with respect to a plurality of potential sequences, the normal sequence profile defining a plurality of normal sequences and a plurality of triggers, wherein each of the plurality of normal sequences is associated with a timeframe, wherein each sequence is a series including a plurality of condition combinations;

preprocessing a second data set, wherein preprocessing the second data set further comprises generating a plurality of second messages in a unified format;

identifying at least one instance of one of the plurality of triggers in the plurality of second messages;

detecting at least one abnormal sequence based on the identified at least one instance and the normal sequence profile, wherein each of the at least one abnormal sequence is detected when none of the plurality of normal sequences is identified in the second data set with respect to the at least one instance and each associated timeframe; and removing the plurality of second messages from a database.

11. A system for connected vehicle sequence anomaly detection, comprising:

a processing circuitry; and a memory, the memory containing instructions that, when executed by the processing circuitry, configure the system to:

create a normal sequence profile for a group of connected vehicles based on a first data set including a plurality of first messages, the group including at least one connected vehicle, each message indicating communications data related to the group of connected vehicles, wherein the normal sequence profile is created by training a normal behavior model using unsupervised machine learning with respect to a plurality of potential sequences, the normal sequence profile defining a plurality of normal sequences and a plurality of triggers, wherein each of the plurality of normal sequences is associated with a timeframe, wherein each sequence is a series including a plurality of condition combinations;

preprocess a second data set, wherein preprocessing the second data set further comprises generating a plurality of second messages in a unified format;

identify at least one instance of one of the plurality of triggers in the plurality of second messages;

detect at least one abnormal sequence based on the identified at least one instance and the normal sequence profile, wherein each of the at least one abnormal sequence is detected when none of the plurality of normal sequences is identified in the second data set with respect to the at least one instance and each associated timeframe; and remove the plurality of second messages from a database.

12. The system of claim 11, wherein each of the plurality of second messages is an abstracted message including only data that is relevant to sequence analysis.

13. The system of claim 11, wherein each condition combination includes at least two conditions having a correlation in the plurality of first messages above a threshold.

14. The system of claim 11, wherein the system is further configured to:

iteratively refine the normal behavior model until at most a threshold proportion of abnormal sequences is identified when applying the normal behavior model to the plurality of first messages.

15. The system of claim 11, wherein each timeframe is any of: a window of time prior to occurrence of a respective trigger, and a delay time after occurrence of a respective trigger.

16. The system of claim 11, wherein each sequence is associated with at least one channel among at least two sources of connected vehicle communications data, wherein the system is further configured to:
  identify a plurality of sequences in the second data set, wherein detecting the at least one abnormal sequence further comprises comparing each sequence identified in the second data set with at least one normal sequence of the plurality of normal sequences associated with the same channel.

17. The system of claim 11, wherein each trigger is any of: a time-based trigger, and a condition-based trigger.

18. The system of claim 11, wherein each of the plurality of normal sequences is further associated with a required order for the sequence, wherein the system is further configured to:
  identify a plurality of sequences in the second data set, wherein an abnormal sequence is detected when an order of one of the plurality of sequences identified in the second data set does not match the required order of any of the plurality of normal sequences.

19. The system of claim 11, wherein the plurality of second messages is removed from the database when the at least one abnormal sequence has been detected.

\* \* \* \* \*